United States Patent [19]

Fahnestock

[11] Patent Number: 4,677,893

[45] Date of Patent: Jul. 7, 1987

[54] QUICK MUSIC NOTES SLIDE RULE

[76] Inventor: E. Carl Fahnestock, 1270 Main St., Glastonbury, Conn. 06033

[21] Appl. No.: 748,172

[22] Filed: Jul. 11, 1985

[51] Int. Cl.$^4$ ............................................. G09B 15/02
[52] U.S. Cl. ..................................................... 84/473
[58] Field of Search ................................. 84/473, 474

[56] References Cited

U.S. PATENT DOCUMENTS 2,332,842 10/1943 Champion ............................. 84/473
3,791,254 2/1974 Muller ................................ 84/471 R

FOREIGN PATENT DOCUMENTS 1428750 3/1976 United Kingdom .................. 84/473

Primary Examiner—Lawrence R. Franklin

[57] ABSTRACT

A Music Note Letter and Symbol Display Device which displays Music Note Letter compositions of Scales for each of the Fifteen (15) Major Keys of: C G D A E B F♯ C♯ C♭ G♭ D♭ A♭ E♭ B♭ and F and for each of the Fifteen (15) Minor Keys of: A E B F♯ C♯ G♯ D♯ A♯ A♭ E♭ B♭ F C G D.

The device also displays Sixteen (16) Types of Chords for each of the Fiteen (15) Chord Letters of: C G D A E B F♯ C♯ C♭ G♭ D♭ A♭ E♭ B♭ and F.

The device can also be used to make musical transpositions from one Key/Scale/Chord to another and is used to identify the Music Note Letter compositions of twelve (12) Intervals for each of the Fifteen (15) Major Keys of: C G D A E B F♯ C♯ C♭ G♭ D♭ A♭ E♭ B♭ and F.

All Music Note Letters are displayed through readout apertures which are located on the face of its Data Retrieval Member.

11 Claims, 5 Drawing Figures

QUICK MUSIC NOTES SLIDE RULE

BACKGROUND OF THE INVENTION

1. Field of the Invention

This invention is categorized in the field of Music Slide Rule Devices which display, reference and/or teach the Music Note Letter compositions of Scales, Chords and Intervals.

2. Description of the Prior Art

The prior art of musical note letter display, reference and teaching aids contain numerous devices and publications which have been developed as early as 1853 (Re: U.S. Pat. No. 10,217, 1853, Samuel Tillman, Improved Method of Illustrating and measuring musical Intervals). The word "Improved" as used above implies that relevant art prior to 1853 exists but diligent research by the current inventor has not uncovered art from periods preceding 1853.

The prior art evolved as people discovered novel methods for displaying and identifying the music note letter combinations which comprise various musical expressions. While music theory has remained relatively unchanged through the period 1853 to current, the needs of contemporary musicians in general have changed significantly. Many musicians who are exploring music as an avocation are devoting less time to the study of music theory and would rather use training aids to quickly identify Scale and/or Chord Music Note Letters.

This is in part due to the large number of music books available which list chord names only (i.e. not the actual staff/note convention) to identify the proper chords to be played for a given musical composition.

The basic structure and functional purpose of the current invention were designed to meet the needs of the contemporary musician by providing a quick and accurate display of needed music note letter information.

SUMMARY OF THE INVENTION

The current invention provides a method of quickly and accurately identifying, through a direct visual readout display, the music note letters comprising a wide spectrum of music information.

As claimed, the invention has a plurality of slidable members and a plurality of stationary members which together form a Music Note Letter Display Device which will quickly display the following music note letter information without requiring the student to interpolate and/or reference numbers or other symbols:

(1) Music Note Letters defining the Chromatic Scale and Major Scale for each of the fifteen (15) Major Keys: C G D A E B F♯ C♯ C♭ G♭ D♭ A♭ E♭ B♭ and F. The device will properly display the note letter(s) directly without requiring the student to choose from several displayed possibilities. For example, in the Key of C♯, the device displays the proper note naming convention of E♯ as the third note of the Major Scale.

(2) Music Note Letters defining the Natural Minor Scale, Harmonic Minor Scale and Melodic Minor (ascending and descending) scales for each of the fifteen (15) Minor Keys (which are by definition the Relative Minor Keys as associated respectively with each of the above listed Major Keys): A E B F♯ C♯ G♯ D♯ A♯ A♭ E♭ B♭ F C G and D. The device will properly display the note letter(s) directly without requiring the student to choose from several displayed possibilities. Where double sharps are indicated in certain scales, the device will properly identify the note representation.

(3) Music Note Letters defining at least all of the Chord Types listed below for each of the following Chord Letters: C G D A E B F♯ C♯ C♭ G♭ D♭ A♭ E♭ B♭ and F.

Chords Types: Major Triad, Minor Triad, Augmented Triad, Diminished Triad, Flatted Fifth Triad, Sixth, Minor Sixth, Seventh, Major Seventh, Minor Seventh, Diminished Seventh, Seventh Suspended, Major Seventh with Sharp Fifth, Seventh with Sharp Fifth, Seventh with Flat Fifth and Minor Seventh with Flat Fifth.

In addition to the above direct readout display features, the device will also identify the music note letters for Twelve (12) types of Intervals for each of the Fifteen (15) Major Keys by user reference of the numbers placed adjacent the Chromatic Scale and in conjuction with the following table:

| Interval Name | Chromatic Scale Numbers |
| --- | --- |
| m2, A unison | 1 & 2 |
| M2, d3 | 1 & 3 |
| m3, A2 | 1 & 4 |
| M3, d4 | 1 & 5 |
| P4, A3 | 1 & 6 |
| A4, d5 | 1 & 7 |
| d5, A4 | 1 & 7 |
| P5, d6 | 1 & 8 |
| A5, m6 | 1 & 9 |
| M6, d7 | 1 & 10 |
| m7, A6 | 1 & 11 |
| M7, d octave | 1 & 12 |

Finally, the time required to transpose music note letters is decreased due to the quick accessibility of the wide range of scales and chords provided by the device for the Fifteen (15) Major Keys, Fifteen (15) Relative Minor Keys and Fifteen (15) Chord Letters. However, if the user desires to transpose any music composition not provided (such as the melody of a song), he/she can reference the numbers located adjacent the Chromatic Scale for any Major Key, and then re-position the device to read the transposed note letters for any of the remaining fourteen (14) Major Keys.

BRIEF DESCRIPTION OF THE DRAWINGS

FIGS. 2.A and 2.B collectively form a view of an embodiment of music alphabet and symbolic data provided in a data storage member used in the retrieval of "Natural" and "Sharp" Key data.

DESCRIPTION OF PREFERRED EMBODIMENTS

A preferred embodiment of the invention (in linear slide rule form) is illustrated collectively by all of the drawings.

The cooperative interaction of the data retrieval member (FIG. 1) and the first data storage member (FIGS. 2.A and 2.B are joined at their curved edges) will produce displays of music note letter data for the following Major Key, Minor Key and Chord combinations:

| Major Key: | C | G | D | A | E | B | F# | C# |
|---|---|---|---|---|---|---|---|---|
| Minor Key: | A | E | B | F# | C# | G# | D# | A# |
| Chord: | C | G | D | A | E | B | F# | C# |

If the data retrieval member (FIG. 1) is positioned over the data storage member (FIGS. 2.A and 2.B) for retrieval of data for a given Major Key, Minor Key and Chord combination, the following music note letter data will be displayed:

(1) For the Major Key which has been selected by the "Major Scale Selector"
   Scales: Major and Chromatic
(2) For the Minor Key which has been selected by the "Minor Scale Selector"
   Scales: Natural Minor, Harmonic Minor, Melodic Ascending Minor and Melodic Descending Minor.
(3) For the Chord Letter which has been selected by the "Chord Selector"
   Chords: Major Triad, Minor Triad, Augmented Triad, Diminished Triad, Sixth, Minor Sixth, Flatted Fifth Triad, Seventh, Major Seventh, Minor Seventh, Diminished Seventh, Suspended Seventh, Major Seventh with Sharp Fifth, Seventh with Sharp Fifth, Seventh with Flat Fifth and Minor Seventh with Flat Fifth.

The cooperative interaction of the data retrieval member (FIG. 1) and the second data storage member (FIGS. 3.A and 3.B are joined at their curved edges) will produce displays of music note letter data for the following Major Key, Minor Key and Chord combinations:

| Major Key: | C♭ | G♭ | D♭ | A♭ | E♭ | B♭ | F |
|---|---|---|---|---|---|---|---|
| Minor Key: | A♭ | E♭ | B♭ | F | C | G | D |
| Chord: | C♭ | G♭ | D♭ | A♭ | E♭ | B♭ | F |

If the data retrieval member (FIG. 1) is positioned over the data storage member (FIGS. 3.A and 3.B) for retrieval of data for a given Major Key, Minor Key and Chord combination, the following music note letter data will be displayed:

(1) For the Major Key which has been selected by the "Major Scale Selector"
   Scales: Major and Chromatic
(2) For the Minor Key which has been selected by the "Minor Scale Selector"
   Scales: Natural Minor, Harmonic Minor, Melodic Ascending Minor and Melodic Descending Minor.
(3) For the Chord Letter which has been selected by the "Chord Selector"
   Chords: Major Triad, Minor Triad, Augmented Triad, Diminished Triad, Sixth, Minor Sixth, Flatted Fifth Triad, Seventh, Major Seventh, Minor Seventh, Diminished Seventh, Suspended Seventh, Major Seventh with Sharp Fifth, Seventh with Sharp Fifth, Seventh with Flat Fifth and Minor Seventh with Flat Fifth.

Figure 2A:
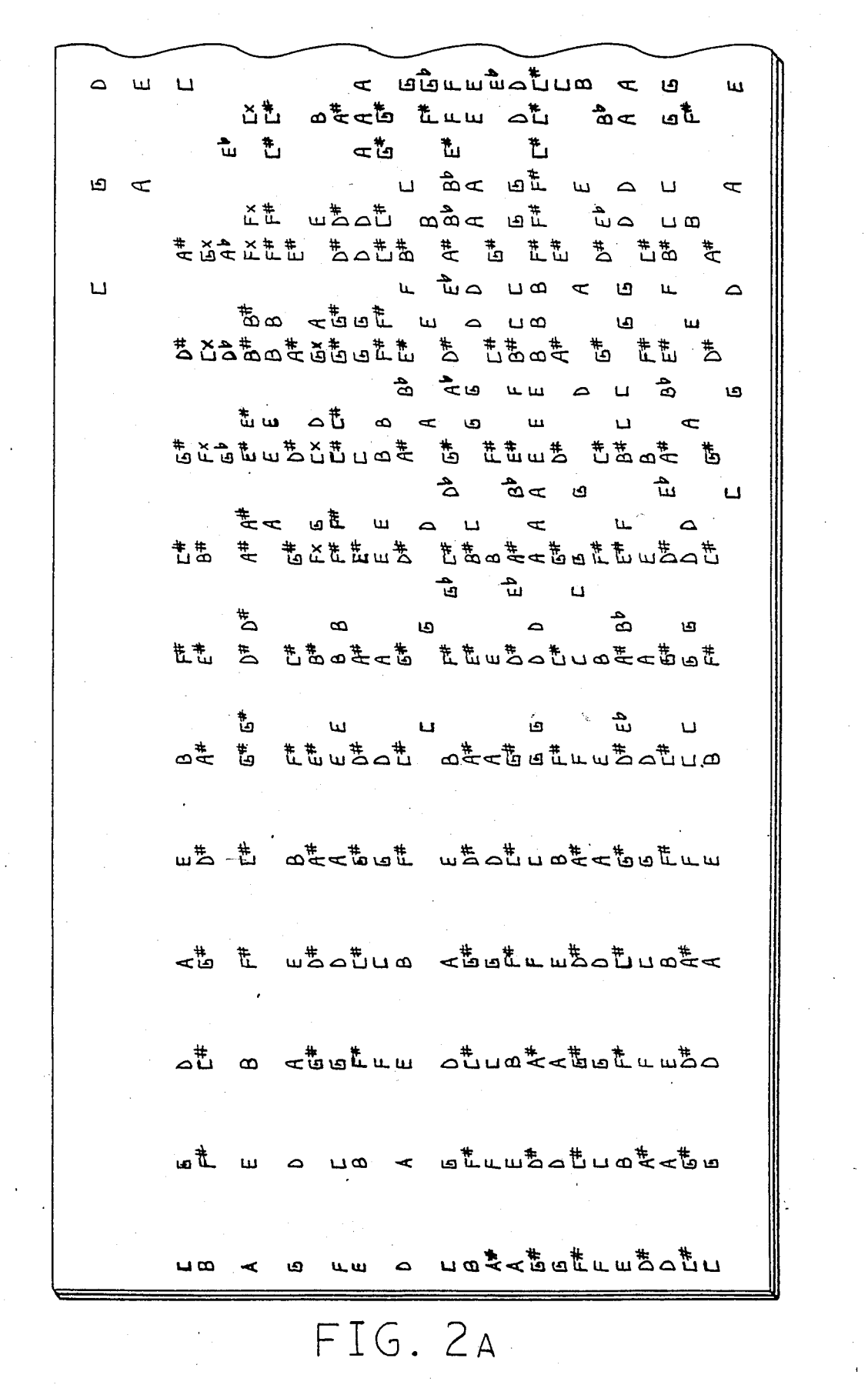
Figure 2B:
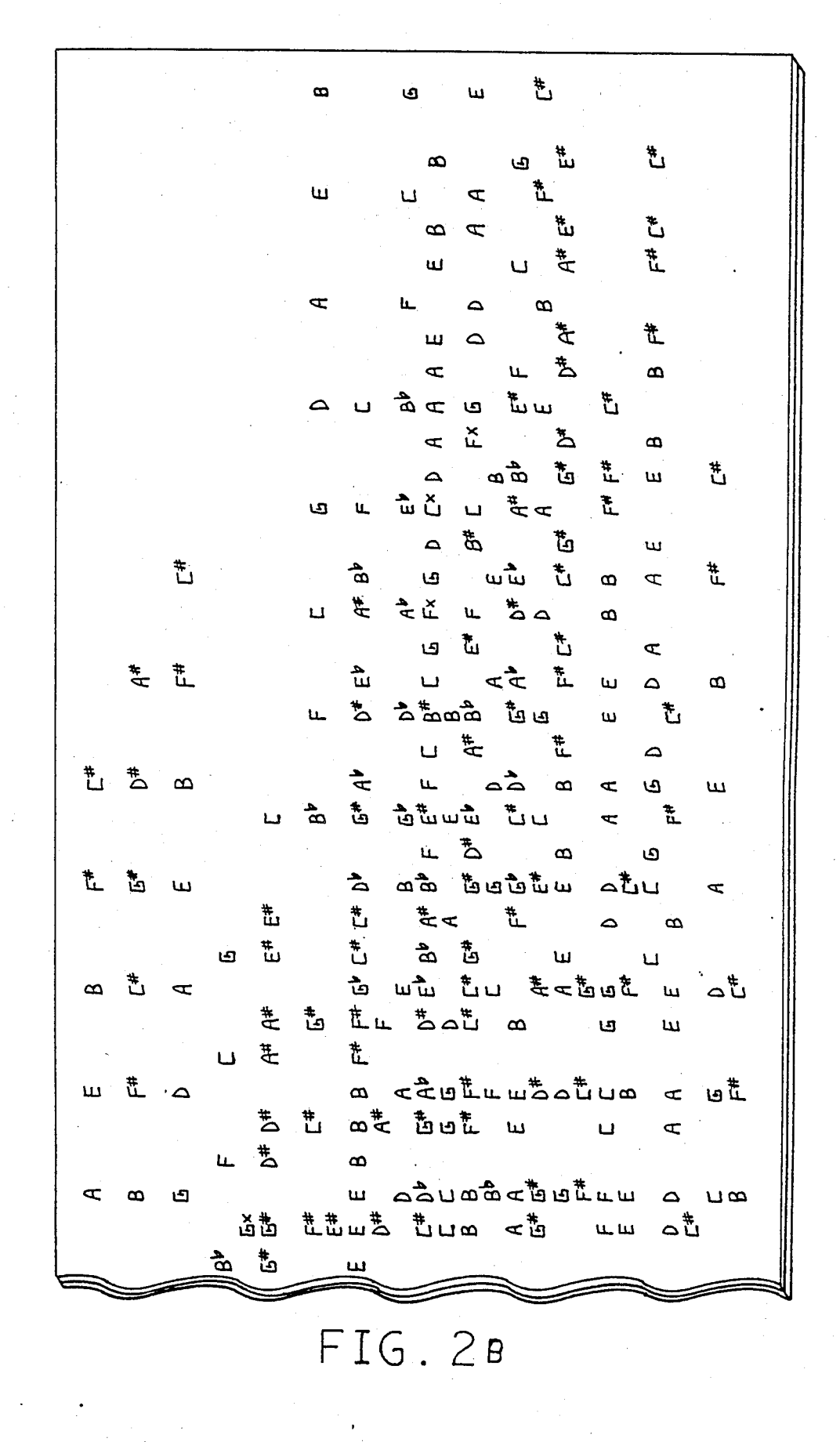
Figure 3A:
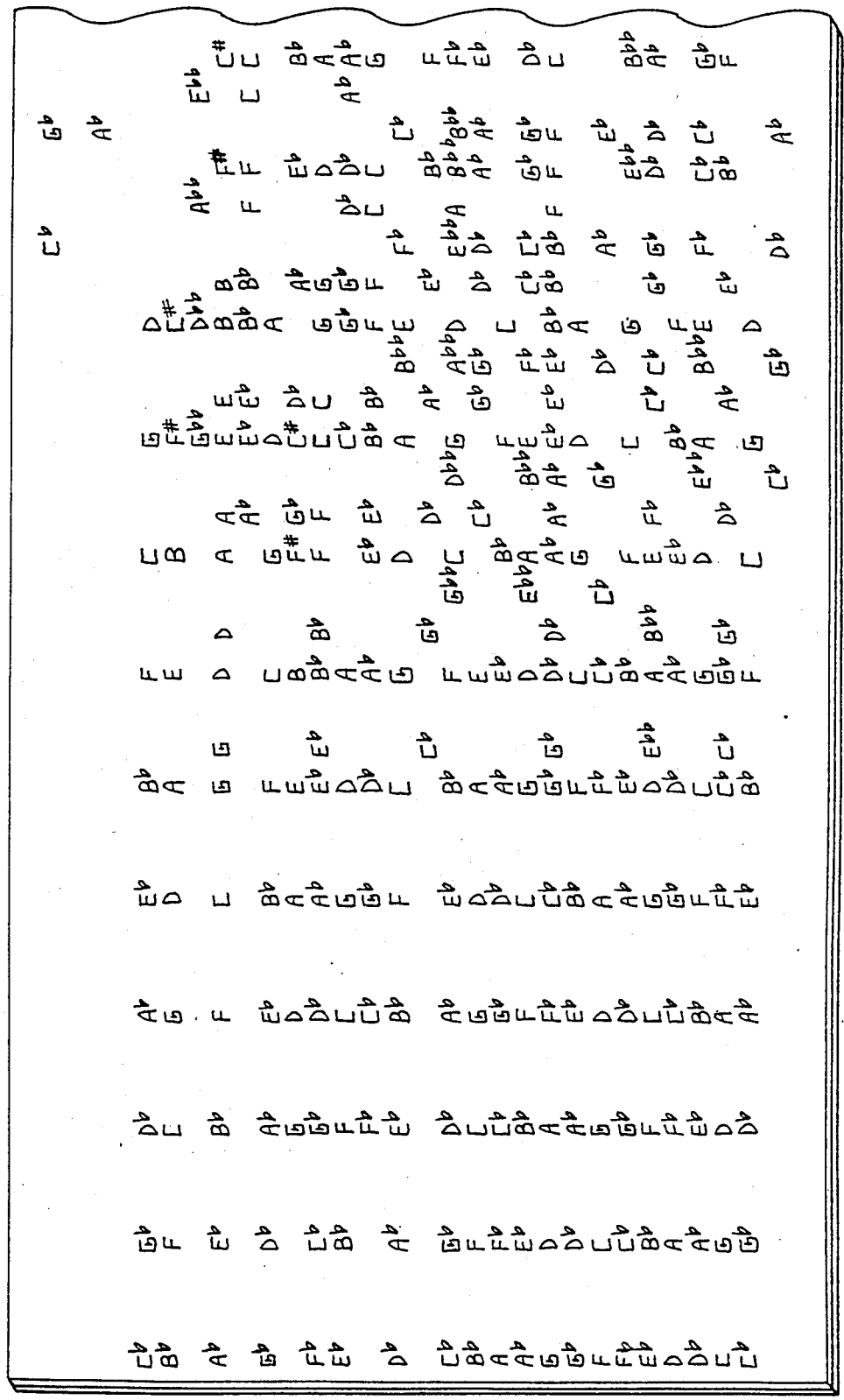
FIGS. 3.A and 3.B collectively form a view of an embodiment of music alphabet and symbolic data provided in a data storage member used in the retrieval of "Flat" Key data.
Figure 3B:
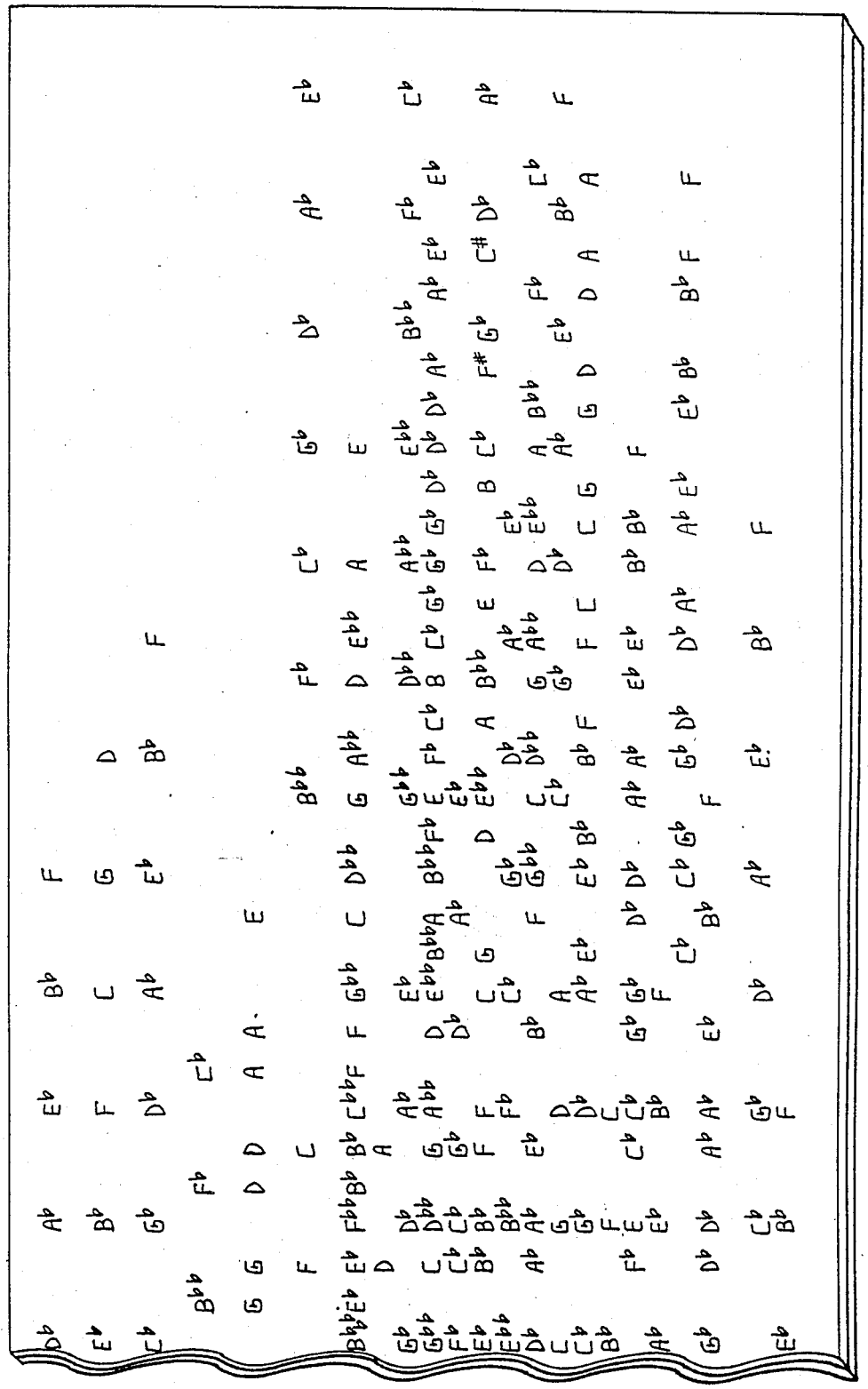

The sections which follow detail the precision required to construct the data retrieval member (FIG. 1) and both data storage members (FIGS. 2.A, 2.B and FIGS. 3.A, 3.B)

CONSTRUCTION OF THE DATA RETRIEVAL MEMBER (FIG. 1)

The data retrieval member (FIG. 1) is constructed by the precision placement of one hundred and thirteen (113) apertures on its face in accordance with a standard geometric format. The geometric format is defined by a two (2) dimensional grid which contains a horizontal or "X" axis and a vertical or "Y" axis.

The "X" axis contains fifty (50) columns (referenced consecutively from left to right as 1 through 50) wherein each column has sufficient width to accomodate the display of up to three alpha/symbolic music note letter characters.

The "Y" axis contains thirty (30) rows (referenced consecutively from bottom to top as 1 through 30) wherein each row has sufficient height to accomodate the display of alpha/symbolic music note letter characters.

Each of the one hundred and thirteen (113) apertures is positioned (and its location uniquely identified on the face of the retrieval member) with respect to its "X" and "Y" coordinate. The specific location of each aperture is defined by an (X,Y) coordinate point format where:

X = the horizontal plane location
Y = the vertical plane location

The unique coordinate point location for each of the 113 apertures is defined below:

SELECTORS

Major Scale Selector (30,30)

Minor Scale Selector (33,28)

Chord Selector (36,26)

SCALES

Chromatic/Major (1,2) (1,3) (1,4) (1,5) (1,6) (1,7) (1,8) (1,9) (1,10) (1,11), (1,12), (1,13)

Major (1,14) (1,16) (1,18) (1,19) (1,21) (1,23) (1,25) (1,26)

Natural Minor (4,4) (4,6) (4,7) (4,9) (4,11) (4,12) (4,14) (4,16)

Harmonic Minor (7,9) (7,11) (7,12) (7,14) (7,16) (7,17) (7,20) (7,21)

Melodic Minor (ascending)

(10,14) (10,16) (10,17) (10,19) (10,21) (10,23) (10,25) (10,26)

Melodic Minor (descending)

(10,14) (10,12) (10,10) (10,9) (10,7) (10,5) (10,4) (10,2)
(Note: coordinate (10,14) is shared by both Melodic Scales)

CHORDS

Major (13,10) (13,14) (13,17)

minor (17,3) (17,6) (17,10)

Aug (17,15) (17,19) (17,23)

dim (21,8) (21,11) (21,14)

6

(23,13) (23,17) (23,20) (23,22)

m 6

(24,1) (24,4) (24,8) (24,10)

♭5

(25,18) (25,22) (25,24)

7

(27,6) (27,10) (27,13) (27,16)

Maj 7

(29,11) (19,15) (29,22)

m 7

(32,4) (32,7) (32,11) (34,14)

dim 7

(36,9) (36,12) (36,15) (36,18)

7 (sus)

(39,2) (39,7) (39,9) (39,12)

Maj 7♯5

(41,7) (41,11) (41,15) (41,18)

7♯5

(46,5) (46,9) (46,13) (46,15)

7♭5

(48,5) (48,9) (48,11) (48,15)

m 7♭5

(50,10) (50,13) (50,16) (50,20)

CONSTRUCTION OF DATA STORAGE MEMBER (FIGS. 2.A and 2.B)

A "blank" data storage member is formatted by plotting on its surface a two (2) dimensional grid containing a horizontal or "X" axis and a vertical or "Y" axis.

Figure 1:
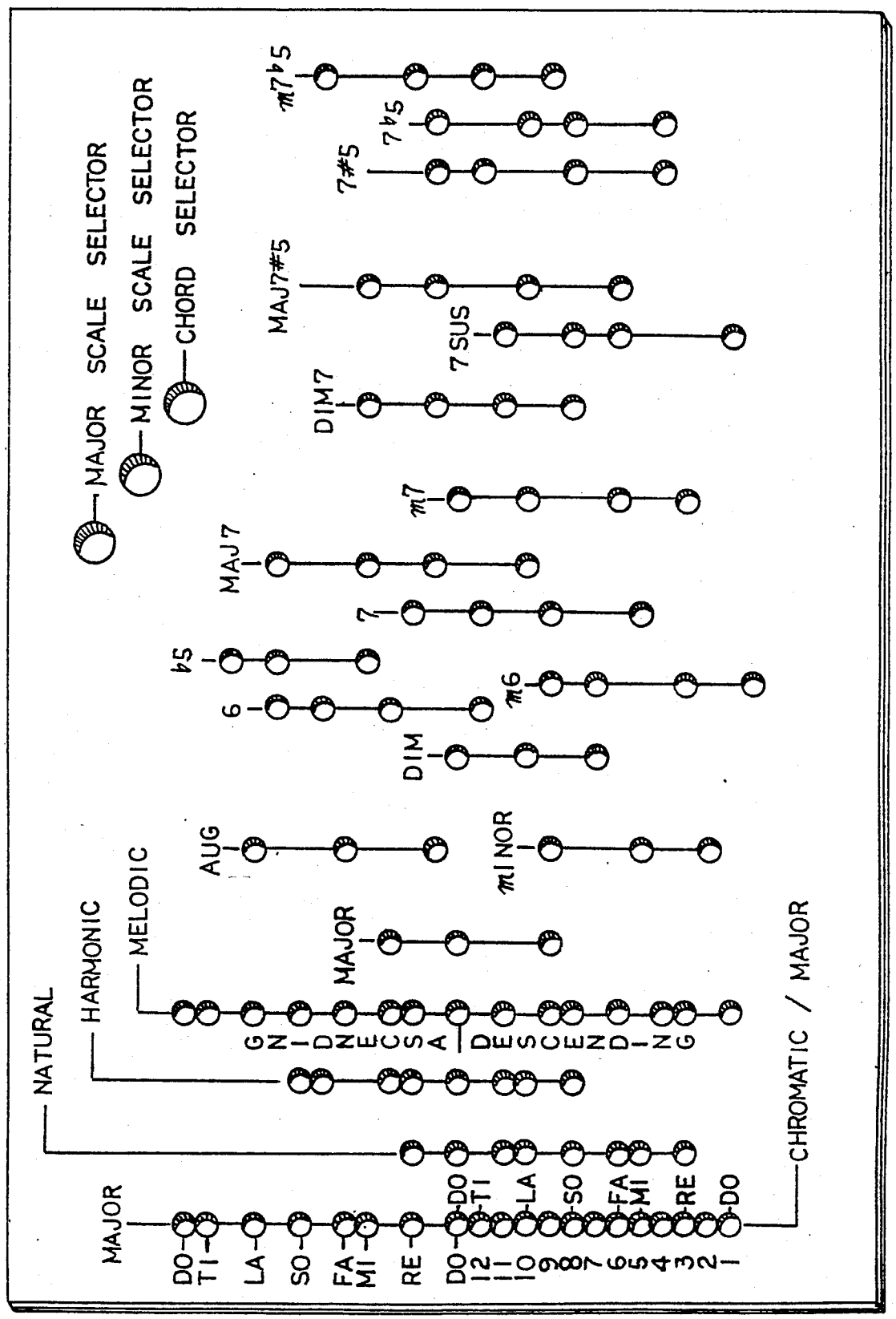
FIG. 1 is a view of the data retrieval member.

The "X" axis contains seventy-one (71) columns (referenced consecutively from left to right as 1 through 71) wherein each column is of sufficient width to accomodate the display of up to three alpha/symbolic music note letter characters. The width of each column must be exactly equal to the column width used in the construction of the data retrieval member (FIG. 1).

The "Y" contains thirty (30) rows (referenced consecutively from bottom to top as 1 through 30) wherein each row has sufficient height to accomodate the display of alpha/symbolic music note letter characters. The height of each row must be exactly equal to the row height used in the construction of the data retrieval member (FIG. 1).

The data retrieval member (FIG. 1) is next positioned over the formatted data storage member with precise alignment of the "X" and "Y" axis. Columns 1 thru 50 of the data retrieval member (FIG. 1) must be directly aligned with columns 1 thru 50 respectively on the formatted data storage member. Rows 1 thru 30 of the data retrieval member (FIG. 1) must be aligned with Rows 1 thru 30 respectively on the data storage member.

In the above described position the device is aligned for the display of the music note letters for the following selections:
* Major Scale Selector=C
* Minor Scale Selector=A
* Chord Selector=C The proper alpha/symbolic representation for each music note letter for each scale and chord as defined for the above selections (C, A and C) should be entered on the data storage member through the access provided through each of the 113 apertures. When all 113 entries have been made, the data retrieval member (FIG. 1) should be re-positioned such that Columns 1 thru 50 are directly aligned with Columns 4 thru 53 respectively on the data storage member. Rows 1 thru 30 on the data retrieval member (FIG. 1) should continue to be directly aligned with Rows 1 thru 30 respectively on the data storage member.

In this new position the device is aligned for the display of the music note letters for the following selections:
* Major Scale Selector=G
* Minor Scale Selector=E
* Chord Selector=G The proper alpha/symbolic representation for each music note letter for each scale and chord as defined for the new selections (G, E and G) should be entered on the data storage member through the access again provided through each of the 113 apertures. It should be noted that less than 113 entries will be required since some of the music note letter information entered in the previous position is now being displayed through some of the apertures.

When all 113 entries have been made, the data retrieval member (FIG. 1) should be re-positioned such that Columns 1 thru 50 are directly aligned with Columns 7 thru 56 respectively on the data storage member. Rows 1 thru 30 on the data retrieval member (FIG. 1) should continue to be directly aligned with Rows 1 thru 30 respectively on the data storage member.

In this new position the device is aligned for the display of the music note letters for the following selections:
* Major Scale Selector=D
* Minor Scale Selector=B
* Chord Selector=D The proper alpha/symbolic representation for each music note letter for each scale and chord as defined for the new selections (D, B and D) should be entered on the data storage member through the access again provided through each of the 113 apertures. It should be noted that less than 113 entries will be required since some of the music note letter information entered in the previous position is now being displayed through some of the apertures.

When all 113 entries have been made, the data retrieval member (FIG. 1) should be re-positioned such that Columns 1 thru 50 are directly aligned with Columns 10 thru 59 respectively on the data storage member. Rows 1 thru 30 on the data retrieval member (FIG. 1) should continue to be directly aligned with Rows 1 thru 30 respectively on the data storage member.

In this new position the device is aligned for the display of the music note letters for the following selections:

* Major Scale Selector=A
* Minor Scale Selector=F#
* Chord Selector=A

The proper alpha/symbolic representation for each music note letter for each scale and chord as defined for the new selections (A, F# and A) should be entered on the data storage member through the access again provided through each of the 113 apertures. It should be noted that less than 113 entries will be required since some of the music note letter information entered in the previous position is now being displayed through some of the apertures.

When all 113 entries have been made, the data retrieval member (FIG. 1) should be re-positioned such that Columns 1 thru 50 are directly aligned with Columns 13 thru 62 respectively on the data storage member. Rows 1 thru 30 on the data retrieval member (FIG. 1) should continue to be directly aligned with Rows 1 through 30 respectively on the data storage member.

In this new position the device is aligned for the display of the music note letters for the following selections:

* Major Scale Selector=E
* Minor Scale Selector=C#
* Chord Selector=E

The proper alpha/symbolic representation for each music note letter for each scale and chord as defined for the new selections (E, C# and E) should be entered on the data storage member through the access again provided through each of the 113 apertures. It should be noted that less than 113 entries will be required since some of the music note letter information entered in the previous position is now being displayed through some of the apertures.

When all 113 entries have been made, the data retrieval member (FIG. 1) should be re-positioned such that Columns 1 thru 50 are directly aligned with Columns 16 thru 65 respectively on the data storage member. Rows 1 thru 30 on the data retrieval member (FIG. 1) should continue to be directly aligned with Rows 1 thru 30 respectively on the data storage member.

In this new position the device is aligned for the display of the music note letters for the following selections:

* Major Scale Selector=B
* Minor Scale Selector=G#
* Chord Selector=B

The proper alpha/symbolic representation for each music note letter for each scale and chord as defined for the new selections (B, G# and B) should be entered on the data storage member through the access again provided through each of the 113 apertures. It should be noted that less than 113 entries will be required since some of the music note letter information entered in the previous position is now being displayed through some of the apertures.

When all 113 entries have been made, the data retrieval member (FIG. 1) should be re-positioned such that Columns 1 thru 50 are directly aligned with Columns 19 through 68 respectively on the data storage member. Rows 1 thru 30 on the data retrieval member (FIG. 1) should continue to be directly aligned with Rows 1 thru 30 respectively on the data storage member.

In this new position the device is aligned for the display of the music note letters for the following selections:

* Major Scale Selector=F#
* Minor Scale Selector=D#
* Chord Selector=F#

The proper alpha/symbolic representation for each music note letter for each scale and chord as defined for the new selections (F#, D# and F#) should be entered on the data storage member through the access again provided through each of the 113 apertures. It should be noted that less than 113 entries will be required since some of the music note letter information entered in the previous position is now being displayed through some of the apertures.

When all 113 entries have been made, the data retrieval member (FIG. 1) should be re-positioned such that Columns 1 thru 50 are directly aligned with Columns 22 thru 71 respectively on the data storage member. Rows 1 thru 30 on the data retrieval member (FIG. 1) should continue to be directly aligned with Rows 1 thru 30 respectively on the data storage member.

In this new position the device is aligned for the display of the music note letters for the following selections:

* Major Scale Selector=C#
* Minor Scale Selector=A#
* Chord Selector=C#

The proper alpha/symbolic representation for each music note letter for each scale and chord as defined for the new selections (C#, A# and C#) should be entered on the data storage member through the access again provided through each of the 113 apertures. It should be noted that less than 113 entries will be required since some of the music note letter information entered in the previous position is now being displayed through some of the apertures.

The entry of music note letter data in this final position completes the construction of the data storage member (FIG. 2.A and 2.B).

CONSTRUCTION OF DATA STORAGE MEMBER (FIGS) 3.A AND 3.B)

A "blank" data storage member is formatted by plotting on its surface a two (2) dimensional grid containing a horizontal or "X" axis and a vertical or "Y" axis.

The "X" axis contains sixty-eight (68) columns (referenced consecutively from left to right as 1 through 68) wherein each column is of sufficient width to accomodate the display of up to three (3) alpha/symbolic music note letter characters. The width of each column must be exactly equal to the column width used in the construction of the data retrieval member (FIG. 1).

The "Y" axis contains thirty (30) rows (referenced consecutively from bottom to top as 1 through 30) wherein each row has sufficient height to accomodate the display of alpha/symbolic music note letter characters. The height of each row must be exactly equal to the row height used in the construction of the data retrieval member (FIG. 1).

The data retrieval member (FIG. 1) is positioned over the formatted data storage member with precise alignment of the "X" and "Y" axis. Columns 1 thru 50 of the data retrieval member (FIG. 1) must be directly aligned with columns 1 thru 50 respectively on the data storage member. Rows 1 thru 30 of the data retrieval member (FIG. 1) must be aligned with Rows 1 thru 30 respectively on the data storage member.

In the above described position the device is aligned for the display of the music note letters for the following selections:

* Major Scale Selector=C♭

* Minor Scale Selector=A♭
* Chord Selector=C♭

The proper alpha/symbolic representation for each music note letter for each scale and chord as defined for the above selections (C♭, A♭ and C♭) should be entered on the data storage member through the access provided through each of the 113 apertures. When all 113 entries have been made, the data retrieval member (FIG. 1) should be re-positioned such that Columns 1 thru 50 are directly aligned with Columns 4 thru 53 respectively on the data storage member. Rows 1 thru 30 on the data retrieval member (FIG. 1) should continue to be directly aligned with Rows 1 thru 30 respectively on the data storage member.

In this new position the device is aligned for the display of the music note letters for the following selections:
* Major Scale Selector=G♭
* Minor Scale Selector=E♭
* Chord Selector=G♭

The proper alpha/symbolic representation for each music note letter for each scale and chord as defined for the new selections (G♭, E♭ and G♭) should be entered on the data storage member through the access again provided through each of the 113 apertures. It should be noted that less than 113 entries will be required since some of the music note letter information entered in the previous position is now being displayed through some of the apertures.

When all 113 entries have been made, the data retrieval member (FIG. 1) should be re-positioned such that Columns 1 thru 50 are directly aligned with Columns 7 thru 56 respectively on the data storge member. Rows 1 thru 30 on the data retrieval member (FIG. 1) should continue to be directly aligned with Rows 1 thru 30 respectively on the data storage member.

In this new position the device is aligned for the display of the music note letters for the following selections:
* Major Scale Selector=D♭
* Minor Scale Selector=B♭
* Chord Selector=D♭

The proper alpha/symbolic representation for each music note letter for each scale and chord as defined for the new selections (D♭, B♭ and D♭) should be entered on the data storage member through the access again provided through each of the 113 apertures. It should be noted that less than 113 entries will be required since some of the music note letter information entered in the previous position is now being displayed through some of the apertures.

When all 113 entries have been made, the data retrieval member (FIG. 1) should be re-positioned such that Columns 1 thru 50 are directly aligned with Columns 10 thru 59 respectively on the data storage member. Rows 1 thru 30 on the data retrieval member (FIG. 1) should continue to be directly aligned with Rows 1 thru 30 respectively on the data storage member.

In this new position the device is aligned for the display of the music note letters for the following selections:
* Major Scale Selector=A♭
* Minor Scale Selector=F
* Chord Selector=A♭

The proper alpha/symbolic representation for each music note letter for each scale and chord as defined for the new selections (A♭, F and A♭) should be entered on the data storage member through the access again provided through each of the 113 apertures. It should be noted that less than 113 entries will be required since some of the music note letter information entered in the previous position is now being displayed through some of the apertures.

When all 113 entries have been made, the data retrieval member (FIG. 1) should be re-positioned such that Columns 1 thru 50 are directly aligned with Columns 13 thru 62 respectively on the data storage member. Rows 1 thru 30 on the data retrieval member (FIG. 1) should continue to be directly aligned with Rows 1 thru 30 respectively on the data storage member.

In this new position the device is aligned for the display of the music note letters for the following selections:
* Major Scale Selector=E♭
* Minor Scale Selector=C
* Chord Selector=E♭

The proper alpha/symbolic representation for each music note letter for each scale and chord as defined for the new selections (E♭, C and E♭) should be entered on the data storage member through the access again provided through each of the 113 apertures. It should be noted that less than 113 entries will be required since some of the music note letter information entered in the previous position is now being displayed through some of the apertures.

When all 113 entries have been made, the data retrieval member (FIG. 1) should be re-positioned such that Columns 1 thru 50 are directly aligned with Columns 16 thru 65 respectively on the data storage member. Rows 1 thru 30 on the data retrieval member (FIG. 1) should continue to be directly aligned with Rows 1 thru 30 respectively on the data storage member.

In this new position the device is aligned for the display of the music note letters for the following selections:
* Major Scale Selector=B♭
* Minor Scale Selector=G
* Chord Selector=B♭

The proper alpha/symbolic representation for each music note letter for each scale and chord as defined for the new selections (B♭, G and B♭) should be entered on the data storage member through the access again provided through each of the 113 apertures. It should be noted that less than 113 entries will be required since some of the music note letter information entered in the previous position is now being displayed through some of the apertures.

When all 113 entries have been made, the data retrieval member (FIG. 1) should be re-positioned such that Columns 1 thru 50 are directly aligned with Columns 19 thru 68 respectively on the data storage member. Rows 1 thru 30 on the data retrieval member (FIG. 1) should continue to be directly aligned with Rows 1 thru 30 respectively on the data storage member.

In this new position the device is aligned for the display of the music note letters for the following selections:
* Major Scale Selector=F
* Minor Scale Selector=D
* Chord Selector=F The proper alpha/symbolic representation for each music note letter for each scale and chord as defined for the new selections (F, D and F) should be entered on the data storage member through the access again provided through each of the 113 apertures. It should be noted that less than 113 entries will be required since some of the music note letter information entered in the previous position is now being displayed through some of the apertures.

The entry of music note letter data in this final position completes the construction of the data storage member (FIG. 3.A and 3.B).

I claim:

1. In a Music Note Letter and Symbol Display Device comprising a data storage member on which are displayed multiple columnar segments of music note letter and symbol combinations where within each said columnar segment are contained three (3) columnar displays which are each uniquely identified by their relative positions within each said columnar segment as left positioned, center positioned and right positioned respectively and where the physical spacing between the said left positioned columnar display and the said center positioned columnar display is equal to the physical spacing between the said center positioned columnar display and the said right positioned columnar display, and where, the physical spacing between the said columnar displays of said columnar segment is equal to the physical spacing between the columnar displays which are contained within any other columnar segment, and where, the physical spacing between any two (2) physically adjacent columnar segments is equal to the physical spacing between any other two (2) physically adjacent columnar segemtns, and where, the physical spacing between any two (2) physically adjacent rows which are contained within any columnar display of any columnar segment is equal to the physical spacing between any two (2) other physically adjacent rows which are contained within any other columnar display which is contained within any other columnar segment, and where, the music note letter and symbol combinations which are either overtly displayed or covertly implied for all rows within any columnar display are ordered by a musically chromatic relationship wherein the unique music note letter and symbol combination which is either overtly displayed or covertly implied within any unique row which is contained within any unique columnar display has a musical value which is one (1) musically chromatic pitch value higher than either the overtly displayed or covertly implied value defined for a first adjacent row which is contained within the said unique columnar display and which said first adjacent row is relatively positioned below the said unique row, and wherein, the said unique music note letter and symbol combination which is either overtly displayed or covertly implied for said unique row has a musical value which is one (1) musically chromatic pitch lower than either the overtly displayed or covertly implied value defined for a second adjacent row which is contained within the said unique columnar display and which said second adjacent row is positioned relatively above said unique row, and where, the musical value which is either overtly displayed or covertly implied for said unique row which is contained within said unique columnar display is identical in musical value to either the overtly displayed or covertly implied musical value or its enharmonic equivalent which is displayed in the same relative row within each of the other two (2) columnar displays which are both contained within the said unique columnar segment which contains said unique columnar display, and where, either the overtly displayed or covertly implied musical values or their enharmonic equivalents which are defined for said unique row which is contained within all columnar displays within said unique columnar segment are seven (7) chromatic pitch values lower than either the overtly displayed or covertly implied musical values or their enharmonic equivalents which are defined for the same relative row which is contained within the physically adjacent columnar segment which said physically adjacent columnar segment is positioned relatively to the right of said unique columnar segment, and whereby, the means for the retrieval of music note letter and symbol combination data is provided by positioning over the said data storage member a data retrieval member which is slidably mounted and which contains readout apertures through which music note letter and symbol combinations can be viewed, and where, within the said data retrieval member are positioned three (3) key apertures which are used to position the said data retrieval member for the retrieval of music note letter and symbol data through the other said readout apertures, and where, the said data retrieval member is in a position for retrieval of music note letter and symbol combination data through the other said readout apertures when music note letter and symbol combination data is simultaneously displayed through all three (3) said key apertures, and where, the musical scale readout apertures which are used in the retrieval of music note letter and symbol combinations which define Major and Minor Scales are positioned to function in cooperation with the three (3) key apertures such that the music note letter and symbol combinations which are viewed through the said musical scale readout apertures are retrieved from only the said relative left positioned columnar display of each participating columnar segment, and where, the unique music note letter and symbol combination displayed through a unique readout aperture for a unique positioning of the three (3) said key apertures defines a unique musical note which is a part of the musical expression of either a musical scale or a musical chord, and where, the said unique music note letter and symbol combination which is displayed on the data storage member in a unique relative columnar display positioning and viewed through said unique readout aperture is used to express a musical note which is a part of another musical expression of either a musical scale or musical chord by display through a second readout aperture which is positioned in the same relative row position and the same relative columnar display positioning as said unique readout aperture and which said second readout aperture is positioned on the said data retrieval member relatively to the left of said unique readout aperture, and where, each music note letter and symbol combination which is displayed on the said data storage member is uniquely located in a relative left positioned or center positioned or right positioned columnar display and defined row positioning within a unique columnar segment whereby each said music note letter and symbol combination is defined for cooperative use only through apertures which have been uniquely defined for functioning within the same relatively positioned columnar display and defined row positioning on the said data retrieval member, and where, the musical note letter and symbol combination which is displayed through a readout aperture is the proper musically correct notation which will define a musical note value used in the musical expression of either scale or chord information for Major or Minor musical keys.

2. In a Music Note Letter Display Device as defined in claim 1, wherein the said data storage member is used in conjunction with said data retrieval member to display the music note letters and symbols defining Major Key Scales for the Eight (8) Major Keys of: C G D A E B F♯ and C♯.

3. In a Music Note Letter Display Device as defined in claim 1, wherein the said data storage member is used in conjunction with said data retrieval member to display the music note letters and symbols defining Major Key Scales for the Seven (7) Major Keys of: C♭ G♭ D♭ A♭ E♭ B♭ and F.

4. In a Music Note Letter Display Device as defined in claim 1, wherein the said data storage member is used in conjunction with said data retrieval member to display the music note letters and symbols defining Minor Key Scales for the Eight (8) Minor Keys of: A E B F♯ C♯ G♯ D♯ and A♯.

5. In a Music Note Letter Display Device as defined in claim 1, wherein the said data storage member is used in conjunction with said data retrieval member to display the music note letters and symbols defining Minor Key Scales for the Seven (7) Minor Keys of: A♭ E♭ B♭ F C G and D.

6. In a Music Note Letter Display Device as defined in claim 1, wherein the said data storage member is used in conjunction with said data retrieval member to display the music note letters and symbols defining Chords for the Eight (8) Chord Letters of: C G D A E B F♯ and C♯.

7. In a Music Note Letter Display Device as defined in claim 1, wherein the said data storage member is used in conjunction with said data retrieval member to display the music note letters and symbols defining Chords for the Seven (7) Chord Letters of: C♭ G♭ D♭ A♭ E♭ B♭ and F.

8. In a Music Note Letter Display Device as defined in claim 1, wherein the said data storage member is used in conjunction with said data retrieval member to display the music note letters and symbols for any of the Eight (8) Major Key Chromatic Scales of: C G D A E B F♯ C♯ which are located adjacent a numerical reference scale which is displayed on the face of said data retrieval member and which said numerical reference scale is used in making musical transpositions from one Major Key to another.

9. In a Music Note Letter Display Device as defined in claim 1, wherein the said data storage member is used in conjunction with said data retrieval member to display the music note letters and symbols for any of the Seven (7) Major Key Chromatic Scales of: C♭ G♭ D♭ A♭ E♭ B♭ F which are located adjacent a numerical reference scale which is displayed on the face of said data retrieval member and which said numerical reference scale is used in making musical transportations from one Major Key to another.

10. In a Music Note Letter Display Device as defined in claim 1, wherein the said data storage member is used in conjunction with said data retrieval member to display the music note letters and symbols for any of the Eight (8) Major Key Chromatic Scales of: C G D A E B F♯ C♯ which are located adjacent a numerical reference scale which is displayed on the face of said data retrieval member and which said numerical reference scale is used in identifying the music note letters and symbols which identify any of Twelve (12) Musical Intervals.

11. In a Music Note Letter Display Device as defined in claim 1, wherein the said data storage member is used in conjunction with said data retrieval member to display the music note letters and symbols for any of the Seven (7) Major Key Chromatic Scales of: C♭ G♭ D♭ A♭ E♭ B♭ F which are located adjacent a numerical reference scale which is displayed on the face of said data retrieval member and which said numerical reference scale is used in identifying the music note letters and symbols which identify any of Twelve (12) Musical Intervals.

* * * * *